US010215442B2

(12) United States Patent
Ellsworth et al.

(10) Patent No.: US 10,215,442 B2
(45) Date of Patent: Feb. 26, 2019

(54) VENTILATION SYSTEM AND METHOD INCLUDING A DIVERTER DUCT FOR FLUIDLY DECOUPLING FANS (71) Applicant: The Boeing Company, Chicago, IL (US)

(72) Inventors: Scott Peterson Ellsworth, Everett, WA (US); George Bates, III, Bothell, WA (US)

(73) Assignee: The Boeing Company, Chicago, IL (US)

( * ) Notice: Subject to any disclaimer, the term of this patent is extended or adjusted under 35 U.S.C. 154(b) by 901 days.

(21) Appl. No.: 14/446,919

(22) Filed: Jul. 30, 2014

(65) Prior Publication Data
US 2016/0033152 A1  Feb. 4, 2016

(51) Int. Cl.
F24F 7/08    (2006.01)
F24F 13/08   (2006.01)
F24F 13/02   (2006.01)
B64D 13/00   (2006.01)
F24F 13/10   (2006.01)

(52) U.S. Cl.
CPC .......... F24F 13/081 (2013.01); B64D 13/00 (2013.01); F24F 13/0236 (2013.01)

(58) Field of Classification Search
CPC ...... F24F 13/081; F24F 13/0236; B64D 13/00
See application file for complete search history.

(56) References Cited

U.S. PATENT DOCUMENTS

| 3,380,475 A | * | 4/1968 | Armstrong | B65D 90/582 137/885 |
| 3,384,421 A | * | 5/1968 | Flatt | B65G 53/56 137/625.44 |
| 3,545,470 A | * | 12/1970 | Paton | B65G 53/56 137/101 |
| 3,773,062 A | * | 11/1973 | McIver | F16K 11/052 137/1 |
| 3,800,689 A | * | 4/1974 | Brown | F24C 15/20 126/299 D |
| 4,362,091 A | * | 12/1982 | Cox | F24F 1/02 454/306 |

(Continued)

FOREIGN PATENT DOCUMENTS

EP    2476960 A1 *  7/2012  .......... F24F 13/0236

Primary Examiner — Kenneth Rinehart
Assistant Examiner — Phillip Decker
(74) Attorney, Agent, or Firm — Vivacqua Law (57) ABSTRACT A diverter duct for a ventilation system includes a main body defining an inner surface, a first portion including an inlet, a second portion located downstream of the first portion, a third portion including an outlet, an opening located between the first portion and the third portion, and an air deflector positioned within the main body downstream of the first portion to deflect a portion of the air from the inlet of the main body towards the opening. A first contoured section is formed in the first portion of the main body. The first contoured section may direct air received from the inlet towards the opening at a first operating condition. A method of installing the diverter duct includes coupling the inlet with an upstream fan, and coupling the outlet with an outlet fan, such that selective operation of the inlet and outlet fans cause vary airflow though the outlet or the opening.

20 Claims, 5 Drawing Sheets

(56) References Cited

U.S. PATENT DOCUMENTS

| | | | | |
|---|---|---|---|---|
| 4,437,608 | A * | 3/1984 | Smith | F24F 11/0001 165/246 |
| 4,628,701 | A * | 12/1986 | Phillips | F25B 49/027 62/184 |
| 5,133,194 | A * | 7/1992 | Army, Jr. | B64D 13/00 415/117 |
| 5,165,450 | A * | 11/1992 | Marrelli | F16K 11/052 137/118.01 |
| 5,320,141 | A * | 6/1994 | Keiper | F16K 11/0873 137/872 |
| 5,368,072 | A * | 11/1994 | Cote | F16K 11/0655 454/234 |
| 5,899,805 | A * | 5/1999 | Dowd | B64D 13/00 454/76 |
| 6,220,957 | B1 * | 4/2001 | Clarkson | F04D 19/005 454/256 |
| 7,082,944 | B2 * | 8/2006 | Gossweiler | A62B 9/02 128/204.27 |
| 7,182,101 | B2 * | 2/2007 | Alacqua | F03G 7/065 137/875 |
| 7,815,012 | B2 * | 10/2010 | Holmgren | B60H 1/00564 454/309 |
| 8,122,908 | B2 * | 2/2012 | Wears | F16K 11/044 137/625.48 |
| 8,326,464 | B2 | 12/2012 | Clanin | |
| 8,342,921 | B2 * | 1/2013 | Huber | B64D 13/00 454/76 |
| 8,442,694 | B2 * | 5/2013 | Jang | F24F 11/006 454/239 |
| 8,483,883 | B1 | 7/2013 | Watson | |
| 9,074,789 | B2 * | 7/2015 | Hanus | F24F 13/0236 |
| 2002/0007859 | A1 * | 1/2002 | Ta | F15D 1/04 138/37 |
| 2006/0102779 | A1 * | 5/2006 | Campbell | B64D 41/00 244/53 B |
| 2011/0021129 | A1 * | 1/2011 | Gundlach | B01D 45/08 454/76 |
| 2011/0139290 | A1 * | 6/2011 | Duell | F16L 33/035 138/155 |
| 2012/0017575 | A1 * | 1/2012 | Sloss | F01N 5/02 60/320 |
| 2012/0034068 | A1 * | 2/2012 | Hussain | F02C 6/06 415/115 |
| 2013/0020798 | A1 * | 1/2013 | Wallin | F24F 13/0209 285/133.11 |
| 2013/0237140 | A1 * | 9/2013 | Contreras | F24F 11/0076 454/239 |
| 2014/0045415 | A1 * | 2/2014 | Mansfield-Marcoux | F16L 41/023 454/76 |
| 2014/0248832 | A1 * | 9/2014 | Hanus | F24F 13/0236 454/242 |
| 2015/0038067 | A1 * | 2/2015 | Byon | B60H 1/00021 454/160 |
| 2017/0080781 | A1 * | 3/2017 | Kwak | B60H 1/00064 |

* cited by examiner

| | First Operating Condition | Second Operating Condition | Third Operating Condition |
|---|---|---|---|
| Upstream Fan | On | On | Off |
| Downstream Fan | Off | On | On |
| Air within the Diverter Duct Enters from ? | Inlet 30 | Inlet 30 | Opening 34 |
| Air within the Diverter Duct Exits from ? | Opening 34 | Outlet 32 | Outlet 30 |

VENTILATION SYSTEM AND METHOD INCLUDING A DIVERTER DUCT FOR FLUIDLY DECOUPLING FANS

FIELD

The disclosed system relates to a diverter duct and, more particularly, to a diverter duct in a ventilation system that selectively redirects airflow based on operation of a first fan located upstream of the diverter duct and a second fan located downstream of the diverter duct.

BACKGROUND

In some aircraft, warm air may be channeled from an electrical equipment (E/E) bay to a cargo bay in order to heat the cargo bay using two fans. Specifically an upstream fan, which may be an E/E fan, pulls the warm air from the E/E bay. A downstream fan, which may be a forward cargo air conditioning (FCAC) fan, forces the warm air into the cargo bay. The upstream fan and the downstream fan may be fluidly coupled to one another by a duct.

Sometimes the upstream fan may be powered before the downstream fan. The operation of the upstream fan forces the warm air through the duct and towards the downstream fan before power is supplied to the downstream fan. The warm air may cause the downstream fan to rotate in an unpowered state, which is also referred to as windmilling. This windmilling may interfere with the ability to eventually supply power to the downstream fan. Specifically, the windmilling of the downstream fan may cause a rotor located within an electric motor to also spin, thereby causing the electric motor to operate as a generator. When power is initially supplied to the electric motor by a controller, a current imbalance may be created if the electric motor is operating as a generator. The controller may cease to supply power to the electric motor once the current balance is detected, and the downstream fan is no longer powered.

In one approach, the controller may include additional control logic or circuitry in order to account for the spinning of the rotor and the current imbalance that is generated within the electric motor when the downstream fan is windmilling. However, the additional circuitry or control logic may increase the cost and complexity of the overall ventilation system. In another attempt to solve the above-described issue, an aperture or gap may be located along the duct between the upstream fan and the downstream fan. The aperture may allow a portion of the warm air to escape from the duct before reaching the downstream fan. However, this approach is not considered to be an effective solution because the gap may not allow for a sufficient amount of warm air to escape the duct in order to substantially prevent the downstream fan from windmilling. Thus, there exists a continuing need in the art for an effective yet economical solution that allows the downstream fan to receive initial power after the upstream fan is turned on.

SUMMARY

In one aspect, a diverter duct for a ventilation system is disclosed. The diverter duct includes a main body that defines an inner surface, a first portion including an inlet, a second portion located downstream of the first portion, a third portion including an outlet, and an opening located between the first portion and the third portion. The diverter duct also includes a first contoured section formed in the first portion of the main body. The inner surface of the main body at the first contoured section may be configured to direct air received from the inlet towards the opening at a first operating condition. The diverter duct also includes an air deflector positioned along the inner surface of the main body downstream of the first portion. The air deflector may be used to deflect a portion of the air received from the inlet of the main body towards the opening at the first operating condition. The air received through the inlet is substantially unable to exit the diverter duct through the outlet at the first operating condition.

In another aspect, a ventilation system including a first operating condition is disclosed. The ventilation system may include a first upstream fan powered on and a second downstream fan powered off at the first operating condition. The ventilation system also includes a diverter duct having an inlet fluidly coupled to the upstream fan and an outlet fluidly coupled to the downstream fan. The diverter duct includes a main body that defines an inner surface, a first portion including the inlet, a second portion located downstream of the first portion, a third portion including the outlet, and an opening located between the first portion and the third portion. The diverter duct also includes a first contoured section formed in the first portion of the main body. The inner surface of the main body at the first contoured section may be configured to direct air received from the inlet of the main body towards the opening at the first operating condition. The diverter duct may also include an air deflector positioned along the inner surface of the main body downstream of the first portion. The air deflector may be used to deflect a portion of the air received from the inlet of the main body towards the opening at the first operating condition. The air received through the inlet is substantially unable to exit the diverter duct through the outlet at the first operating condition.

In yet another aspect, a method of guiding air through a diverter duct of a ventilation system in an aircraft is disclosed. The diverter duct may include a first contoured section including an inlet, a second contoured section, and a third contoured section including an outlet. The method includes generating an airflow by an upstream fan. The inlet of the diverter duct may be fluidly coupled with the upstream fan such that the airflow generated by the upstream fan enters the inlet of the diverter duct. The method further includes guiding the airflow generated by the upstream fan through an opening of the diverter duct by the first contoured section of the diverter duct at a first operating condition of the ventilation system. The method also includes deflecting a portion of the air received from the inlet towards the opening at the first operating condition by an air deflector. The air deflector may be positioned along an inner surface of the diverter duct and downstream of the first contoured section. Finally, the method includes substantially prohibiting the air received through the inlet of the diverter duct from exiting the diverter duct through the outlet at the first operating condition such that a downstream fan fluidly coupled to the outlet of the diverter duct does not substantially windmill.

In still another aspect, a method of installing a diverter duct to an aircraft is disclosed. The diverter duct includes a first contoured section including an inlet, a second contoured section, a third contoured section including an outlet, and an air deflector. The method comprises fluidly coupling the inlet of the diverter duct with an upstream fan such that an airflow generated by the upstream fan enters the inlet of the diverter duct. The airflow generated by the upstream fan may be guided through an opening of the diverter duct by the first contoured section at a first operating condition. The method further comprises fluidly coupling the outlet of the diverter duct with a downstream fan. The airflow received through the inlet of the diverter duct may be substantially prohibited from exiting the diverter duct through the outlet such that the downstream fan does not substantially windmill at the first operating condition. The air deflector of the diverter duct is positioned along an inner surface of the diverter duct and downstream of the first contoured section to deflect the airflow towards the opening at the first operating condition.

Other objects and advantages of the disclosed method and system will be apparent from the following description, the accompanying drawings and the appended claims.

DETAILED DESCRIPTION

Figure 1:
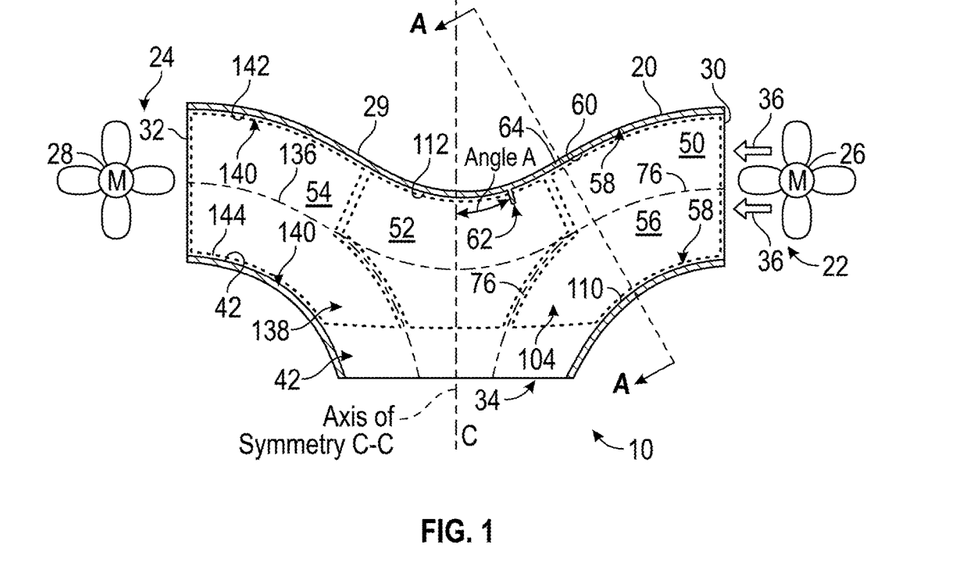
FIG. 1 is a schematic view of an exemplary ventilation system that includes a diverter duct, an upstream fan, and a downstream fan.

As shown in FIG. 1, the disclosed ventilation system 10 according to an aspect of the disclosure may include a diverter duct 20, an upstream fan 22, and a downstream fan 24. FIG. 1 is a cross-sectioned view of the diverter duct 20. In one approach, both the upstream fan 22 and the downstream fan 24 may be mechanical fans for creating airflow. A source of power 26 may be used to operate the upstream fan 22 and a source of power 28 may be used to operate the downstream fan 24. The sources of power 26, 28 may be, for example, electric motors. The diverter duct 20 may be used to fluidly couple and decouple the upstream fan 22 from the downstream fan 24 based on various operating conditions of the upstream fan 22 and the downstream fan 24, which is explained in greater detail below.

In one approach, the upstream fan 22 and the downstream fan 24 may be used in an aircraft (not illustrated). For example, the upstream fan 22 may be an electrical equipment (E/E) bay fan used to pull warm air from an E/E bay of an aircraft and into the diverter duct 20. The downstream fan may be a forward cargo air conditioning (FCAC) fan that forces the warm air from E/E bay into a cargo bay of the aircraft. Although an aircraft is described, it is to be understood that the ventilation system 10 may be used in a variety of other applications such as, for example, automobiles or buildings.

A main body 29 of the diverter duct 20 may define an inlet 30, an outlet 32, and an opening 34. The inlet 30 of the diverter duct 20 may be fluidly coupled to the upstream fan 22. Specifically, an airflow 36 produced by operation of the upstream fan 22 may enter the diverter duct 20 through the inlet 30. The airflow 36 may exit diverter duct 20 through either the outlet 32 or the opening 34 based on the operating conditions of the ventilation system 10. The outlet 32 may be fluidly coupled to the downstream fan 24 such that air exiting the diverter duct 20 through the outlet 32 may be pulled in during operation of the downstream fan 24. In one approach, the opening 34 may be covered by a screen 40 (shown in FIG. 6). The screen 40 may be used to substantially prevent the ingestion of debris into the diverter duct 20 through the opening 34. The opening 34 may be situated along a bottom portion 42 of the diverter duct 20, between the inlet 30 and the outlet 32.

The main body 29 of the diverter duct 20 may also define a first portion 50, a second portion 52, and a third portion 54. The first portion 50 of the diverter duct 20 may include the inlet 30. The second portion 52 of the diverter duct 20 may be located downstream of the first portion 50. The second portion 52 and the opening 34 of the diverter duct 20 may both be located between the first portion 50 and the third portion 54 of the diverter duct 20. The third portion 54 of the diverter duct 20 may include the outlet 32. In the example as shown in FIG. 1, the profile of the first portion 50 and the third portion 54 are substantially mirror images of one another, and include a generally curved or contoured profile described in greater detail below. The profile of the second portion 52 may also be curved or contoured in a direction that generally opposes the contour of the first portion 50 as well as the third portion 54. In other words, the second portion 52 of the diverter duct 20 may create a dip or concave section within the diverter duct 20.

Figure 2A:
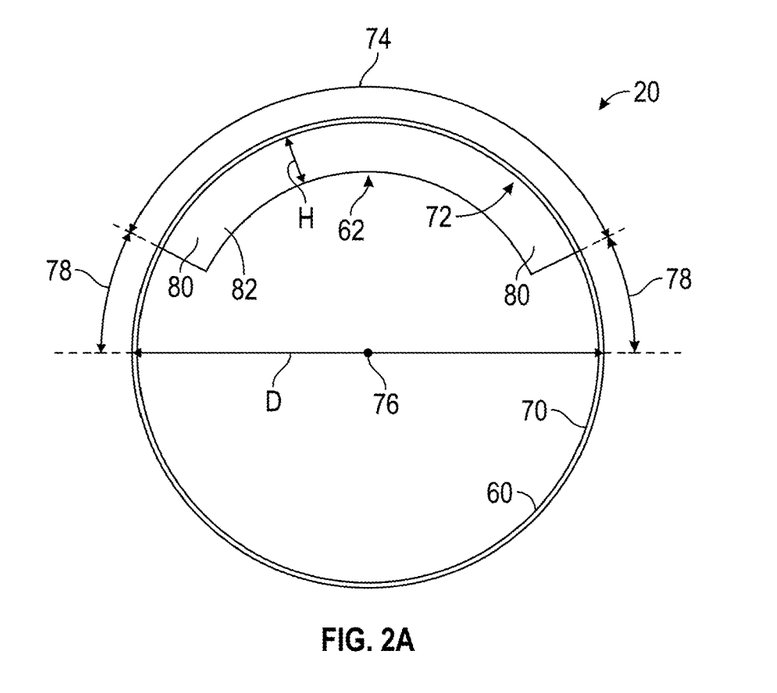
FIG. 2A is a cross-sectioned view of the diverter duct taken along section line A-A in FIG. 1.

As seen in FIG. 1, a tripping dam or air deflector 62 may be located within an interior 56 of the diverter duct 20, and projects from an inner surface 60 of the diverter duct 20. The air deflector 62 may be located downstream of the first portion 50 of the diverter duct 20. Specifically, the air deflector 62 may be located proximate an end 64 of the first portion 50, in the second portion 52 of the diverter duct 20. The air deflector 62 may be angled towards the first portion 50 of the diverter duct 20 (e.g., a free end of the air deflector 62 is nearer the inlet 30 than a fixed end of the air deflector). FIG. 2A is a cross-section of the diverter duct 20 taken along section line A-A in FIG. 1, and includes a view of the air deflector 62. As seen in FIG. 2A, the first portion 50 of the diverter duct 20 may include a substantially circular cross-sectional area or perimeter 70. Although a substantially circular cross-sectional area is illustrated, it is to be understood that the first portion 50 of the diverter duct 20 may include other profiles as well, such as an oval or elliptical profile.

The air deflector 62 may extend around a section of the perimeter 70 of the diverter duct 20. Specifically, in the example as shown the air deflector 62 extends around an upper portion 72 of the inner surface 60 of the diverter duct 20. In particular, the air deflector 62 may extend around the inner surface 60 at an angle 74. The angle 74 may be measured with respect to a center 76 of the cross-sectional area of the first portion 50 of the diverter duct 20. FIG. 2A illustrates the angle 74 including a dimension of about one hundred and twenty degrees. The air deflector 62 may be positioned around a portion of the perimeter 70, between two angles 78. Specifically, each angle 78 may be positioned between a respective side 80 of the air deflector 62 and a horizontal diameter D of the perimeter 70 of the diverter duct 20. In the non-limiting example as shown, the two angles 78 both include a dimension of about thirty degrees.

Figure 2B:
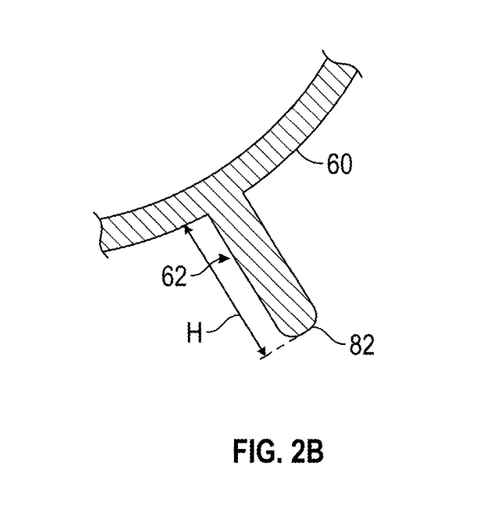
FIG. 2B is an enlarged view of an air deflector shown in FIG. 1.

Referring to both FIGS. 2A and 2B, the air deflector 62 may also include a height H measured from the inner surface 60 of the diverter duct 20 to an edge 82 of the air deflector 62. In one example, the height H of the air deflector 62 is about 25.4 millimeters (about half an inch), and the diameter D of the perimeter 70 of the first portion 50 of the diverter duct 20 is about 177.8 millimeters (about seven inches). Those skilled in the art will appreciate that the illustrations shown in FIGS. 2A and 2B are merely one example of the air deflector 62. Indeed, the air deflector 62 may include a variety of dimensions and geometries.

Referring to both FIGS. 1 and 2B, the air deflector 62 may be oriented within the diverter duct 20 such that a portion of the airflow 36 produced by the upstream fan 22 may be redirected or deflected away from the adjacent inner surface 60 of the diverter duct 20, and towards the opening 34 of the diverter duct 20 during a first operating condition of the ventilation system 10. Specifically, the air deflector 62 may be positioned at an angle A with respect to an axis of symmetry C-C of the diverter duct 20. In one non-limiting example, the angle A of the air deflector 62 may be about seventeen degrees.

Figure 3A:
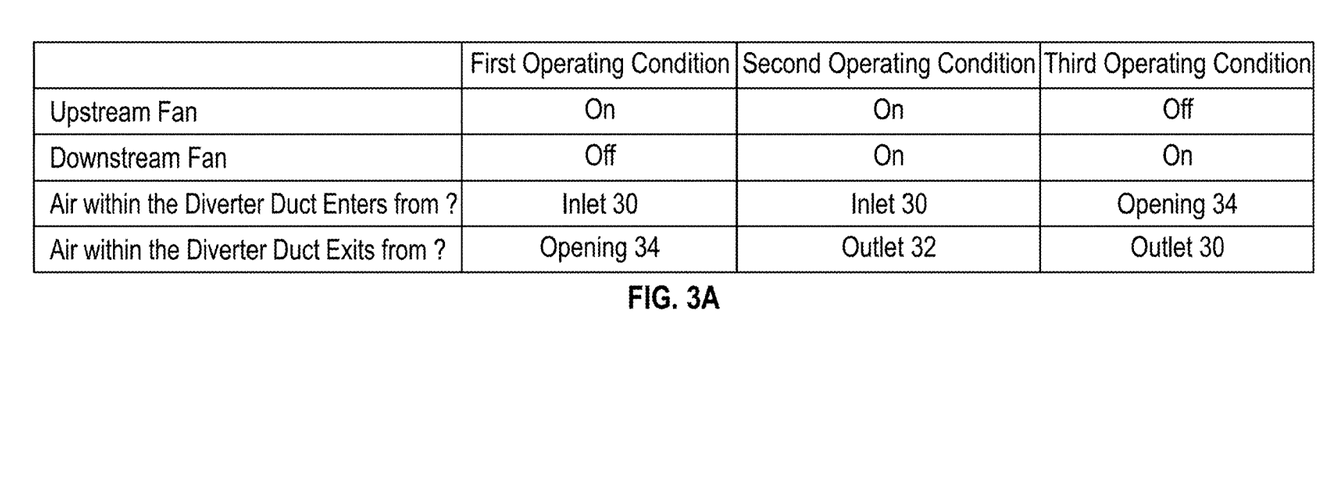
FIG. 3A is a table summarizing various operating conditions of the ventilation system shown in FIG. 1.
Figure 3B:
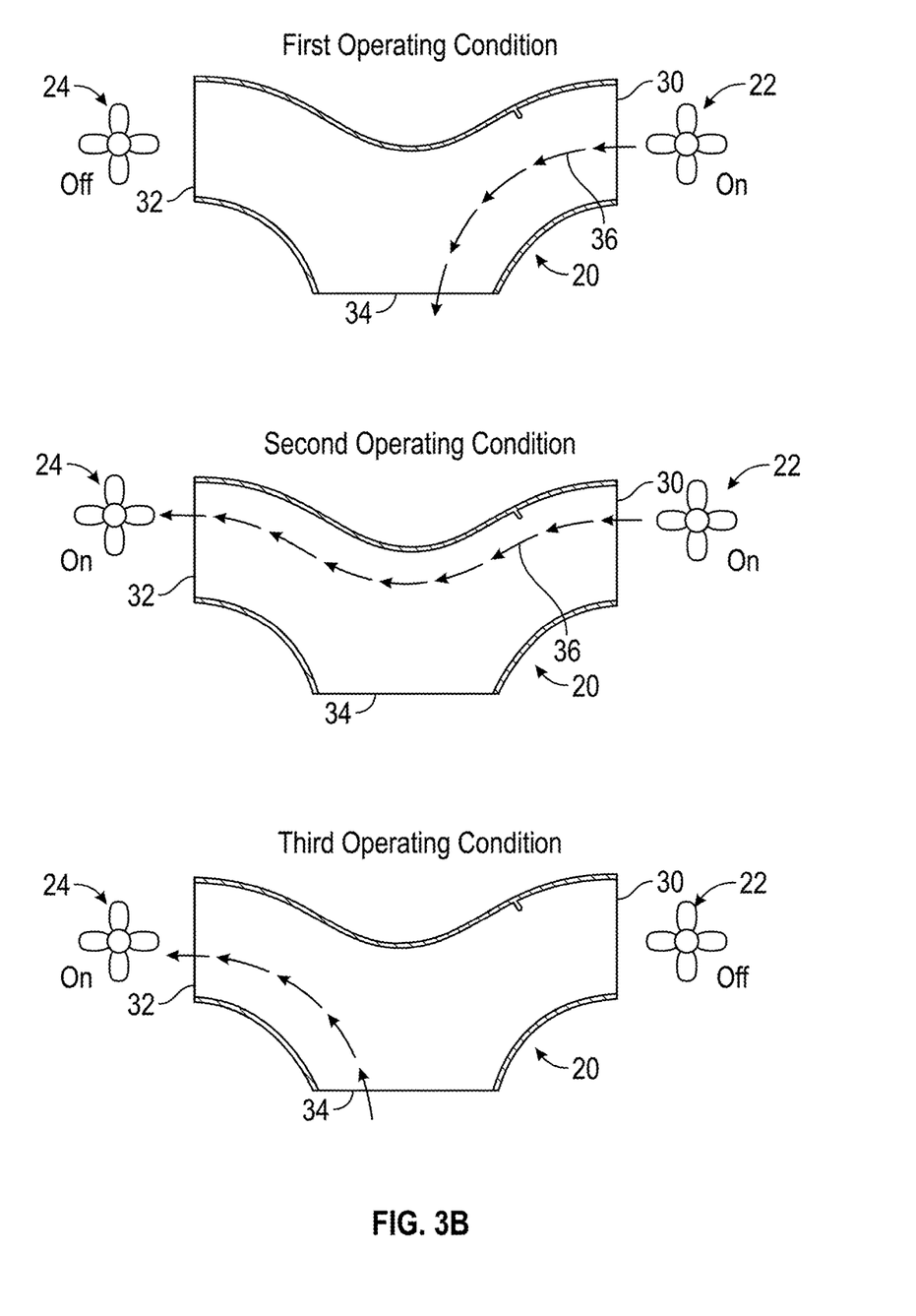
FIG. 3B illustrates airflow through the diverter duct during the various operating conditions summarized in FIG. 3A.

FIG. 3A is a table summarizing the various operating conditions of the ventilation system 10, and FIG. 3B is an illustration of each operating condition. Referring to both FIGS. 1 and 3A, during the first operating condition, the upstream fan 22 is operating (i.e., the power source 26 is activated and the upstream fan 22 generates the airflow 36), and the downstream fan 24 is not operating (i.e., the power source 28 is deactivated and the second fan does not generate a substantial airflow). During the first operating condition, substantially all of the airflow 36 generated by the upstream fan 22 may exit the diverter duct 20 through the opening 34. In other words, the airflow 36 may exit the diverter duct 20 such that the downstream fan 24 may not substantially rotate in an unpowered condition, or windmill.

Figure 4:
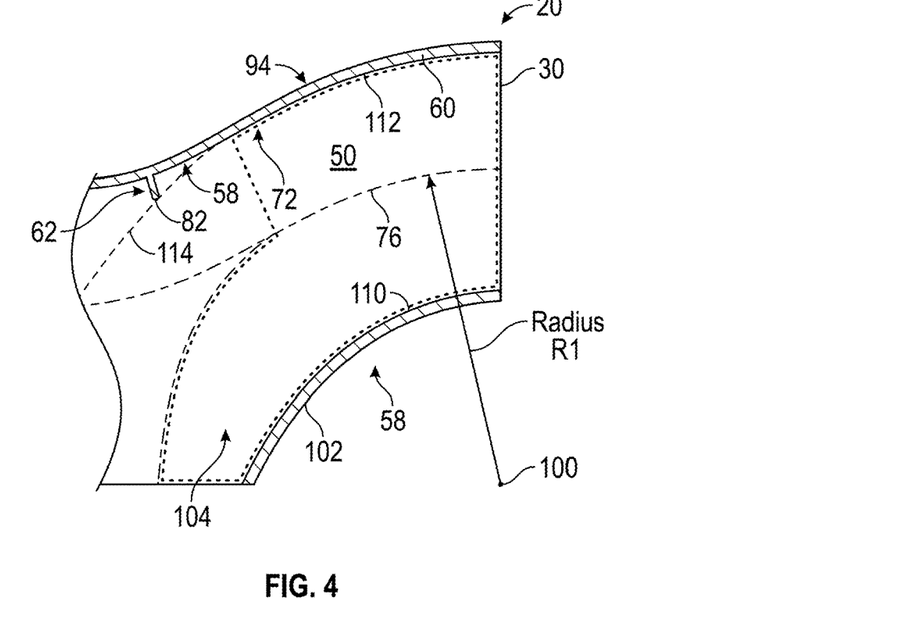
FIG. 4 is an illustration of a first portion of the diverter duct shown in FIG. 1.

Referring to FIG. 1, a curved or contoured section 58 may be formed in the first portion 50 of the diverter duct 20. The contoured section 58 may be shaped to direct the airflow 36 generated by the upstream fan 22 towards the opening 34 of the diverter duct 20 during the first operating condition of the ventilation system 10. Turning now to FIG. 4, a section 94 of the diverter duct 20 is shown. The section 94 includes the first portion 50. The contoured section 58 of the first portion 50 may be defined by a first radius R1 measured between the center 76 of the cross-sectional area of the first portion 50 of the diverter duct 20 and a selected point 100 offset from an outermost surface 102 of the diverter duct 20.

Referring to both FIGS. 2A and 4, the contoured section 58 formed in the first portion 50 of the diverter duct 20 may be substantially shaped as a section of a toroid (i.e., a hollow doughnut-shaped section). Specifically, the perimeter 70 of the diverter duct 20 (FIG. 2A) may define a cross-sectional area of the contoured section 58. The toroidal profile of the contoured section 58 may be defined as the perimeter 70 of the diverter duct 20 is revolved about the selected point 100. The generally toroidal shape of the contoured section 58 may define a lower surface 110 and an upper surface 112. The lower surface 110 of the contoured section 58 may facilitate turning or directing the airflow 36 towards the opening 34 (FIG. 1) during the first operating condition. The generally toroidal shape of a bottom portion 104 of the contoured section 58 of the diverter duct 20 may also extend along the center 76 and towards the opening 34 (FIG. 1).

As explained above, the air deflector 62 may also be used to direct the airflow 36 out of the opening 34 of the diverter duct 20 during the first operating condition. Specifically, the airflow 36 from the upstream fan 22 flowing adjacent or proximate to the upper surface 112 of the contoured section 58 of the diverter duct 20 may be deflected towards the opening 34 by the air deflector 62, which is explained in greater detail below. Therefore, the geometry of the diverter duct 20 may be configured to guide substantially all of the airflow 36 through the opening 34 during the first operating condition.

Referring back to FIG. 1, the second portion 52 of the diverter duct 20 may be used to direct the airflow 36 generated by the upstream fan 22 out of the outlet 32 during a second operating condition of the ventilation system 10. Referring to both FIGS. 1 and 3A, during the second operating condition, the upstream fan 22 as well as the downstream fan 24 are both operating. During the second operating condition, the airflow 36 generated by the upstream fan 22 exits the outlet 32 of the diverter duct 20, and towards the downstream fan 24. The downstream fan 24 may force the airflow 36 to a location downstream of the diverter duct 20 (not illustrated). For example, if the ventilation system 10 is used in an aircraft, then the downstream location may be a cargo bay.

In the non-limiting example as shown in FIG. 1, the second portion 52 of the diverter duct 20 may direct or guide the airflow 36 generated by the upstream fan 22 towards the outlet 32 during the second operating condition. Although the second portion 52 of the diverter duct 20 is also illustrated as having a generally toroidal or rounded shape, it is to be understood that the second portion 52 may include other types of geometrical configurations as well. For example, in another approach the second portion 52 may include a relatively sharp or non-contoured turn used to direct the airflow 36 generated by the upstream fan 22 towards the outlet 32 during the second operating condition.

Figure 5:
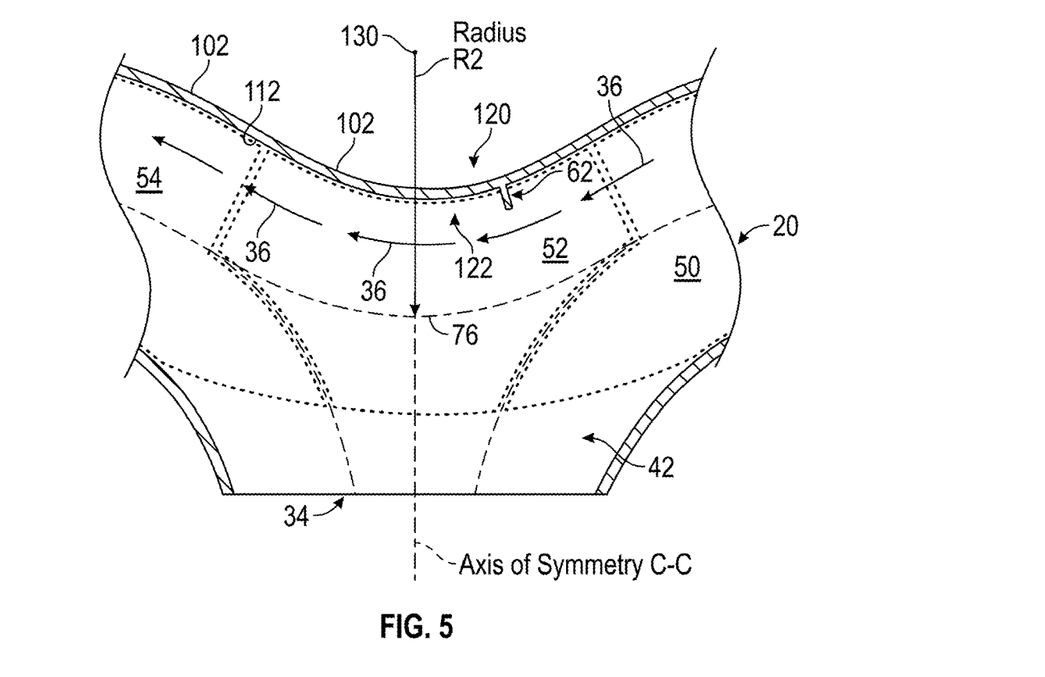
FIG. 5 is an illustration of a second portion of the diverter duct shown in FIG. 1.

Referring to FIG. 5, a section 120 of the diverter duct 20 is shown, where the section 120 includes the second portion 52. The second portion 52 may include a contoured section 122. The contoured section 122 of the second portion 52 may be defined by a second radius R2 measured between the center 76 of the first portion 50 of the diverter duct 20, and a selected point 130 offset from the outermost surface 102 of the diverter duct 20. The second radius R2 may be substantially aligned with the axis of symmetry C-C of the diverter duct 20. Moreover, as seen in FIG. 5, the opening 34 may also be substantially aligned and centered around the axis of symmetry C-C of the diverter duct 20.

Figure 6:
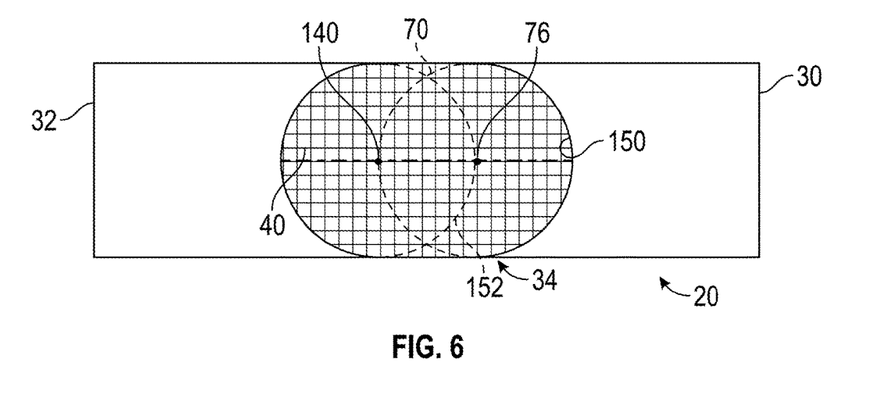
FIG. 6 is a bottom view of the diverter duct shown in FIG. 1.

Referring to both FIGS. 2A and 5, the contoured section 122 of the second portion 52 of the diverter duct 20 may also be defined as a section of a toroid. Specifically, the toroidal shape of the contoured section 122 of the second portion 52 may be defined as the perimeter 70 of the diverter duct 20 at the first portion 50 is revolved about the selected point 130. As seen in FIG. 5, the opening 34 may be located directly below the contoured section 122 of the second portion 52 of the diverter duct. Specifically, as seen in FIG. 1 the bottom portion 42 of the diverter duct 20 may extend from the first portion 50, the second portion 52, and the third portion 54 and downwardly towards the opening 34. The profile of the opening 34 is illustrated in FIG. 6, and is described in greater detail below.

Referring to FIGS. 2A and 4, the air deflector 62 may be sized such that the edge 82 of the air deflector 62 coincides with a continuation line 114 (shown in phantom line). The continuation line 114 may be defined as the toroidal profile of the contoured section 58 that continues or extends past the first portion 50 of the diverter duct 20. In essence, the air deflector 62 makes the airflow 36 respond or behave as if the airflow 36 were actually passing through an extended portion of the contoured section 58 of the diverter duct 20 during the first operating condition. The height H of the air deflector 62 may be tall enough such that during the first operating condition the airflow 36 may not be substantially influenced by the second portion 52 of the diverter duct 20. Moreover, it is also to be understood that the height H of the air deflector 62 may be short enough such that during the second operating condition the airflow 36 may pass or flow over the air deflector 62 and into the third portion 54 of the diverter duct 20. Finally, in an effort to minimize the pressure drop within the diverter duct 20 during the second operating condition, the height H of the air deflector 62 should be as short as possible, while still being tall enough such that during the first operating condition the airflow 36 is not substantially influenced by the second portion 52 of the diverter duct 20. In one example, the ratio between the diameter D of the perimeter 70 of the first portion 50 and the height H of the air deflector 62 may be 14:1.

Turning back to FIG. 1, in one approach the third portion 54 of the diverter duct 20 may be a substantial mirror image of the first portion 50 of the diverter duct 20. Similar to the first portion 50, a curved or contoured section 140 may be formed in the third portion 54 of the diverter duct 20, and may also include a generally toroidal shape. The generally toroidal shape of the contoured section 140 may define an upper surface 142 and a lower surface 144. The third portion 54 may include a substantially identical cross-sectional area as the first portion 50 of the diverter duct 20 (seen in FIG. 2A), and may also include a center 136. The generally toroidal shape of a bottom portion 138 of the contoured section 140 of the diverter duct 20 may also extend along the center 136 and towards the opening 34. The contoured section 140 of the third portion 54 of the diverter duct 20 may be shaped to direct the airflow 36 generated by the upstream fan 22 towards the outlet 32 of the diverter duct 20 during the second operating condition of the ventilation system 10. It should be noted that the contoured section 122 of the second portion 52 and the contoured section 140 of the third portion 54 of the diverter duct 20 may also be used to reduce the pressure drop within the diverter duct 20 during the second operating condition.

Although the third portion 54 is illustrated as a substantial mirror image of the first portion 50 of the diverter duct 20, it is to be understood that in an alternative approach the diverter duct 20 may not be a symmetrical object. For example, the third portion 54 of the diverter duct 20 may include a relatively sharp or non-contoured turn used to direct the airflow 36 generated by the upstream fan 22 towards the outlet 32 during the second operating condition. In yet another approach, the third portion 54 of the diverter duct 20 may include a larger or smaller cross-sectional area when compared to the first portion 50 of the diverter duct 20.

During the second operating condition, the airflow 36 from the upstream fan 22 may be guided out of the diverter duct 20 through the outlet 32. Specifically, the suction created within the diverter duct 20 by operation of the downstream fan 24 may be powerful or strong enough to overcome the effects of the air deflector 62. Moreover, the suction created within the diverter duct 20 may also be sufficient to overcome the effects of the lower surface 110 of the first portion 50 of the diverter duct 20 (i.e., the lower surface 110 of the first portion 50 directing the airflow 36 towards the opening 34). Thus, during the second operating condition, substantially all of the airflow 36 generated by the upstream fan 22 may exit the diverter duct 20 through the outlet 32.

FIG. 6 is a bottom view of the diverter duct 20, where an outer profile 150 of the opening 34 is shown. As seen in FIG. 6, the outer profile 150 of the opening 34 may be substantially oval in shape, and is defined in part by the perimeter 70 of the first portion 50 as well as an perimeter 152 of the third portion 54 of the diverter duct 20. The perimeter 70 of the first portion 50 may intersect the center 136 of the third portion 54 of the diverter duct 20. Similarly, the perimeter 152 of the third portion 54 may intersect the center 76 of the first portion 50 of the diverter duct 20.

Referring to both FIGS. 1 and 6, it is to be understood that the opening 34 may be dimensioned such that during the first operating condition of the ventilation system 10 when the airflow 36 is exiting the diverter duct 20 through the opening 34, the airflow 36 may substantially fill the opening 34. Those skilled in the art will readily appreciate that if the airflow 36 fills the opening 34 during the first operating condition, as the downstream fan 24 is powered on (i.e., during the second operating condition), the airflow 36 may be drawn upwardly, and towards the outlet 32. If the opening 34 is not dimensioned such that during the first operating condition the airflow 36 does not substantially fill the opening 34, then once the downstream fan 24 is powered on the airflow 36 may continue to exit the diverter duct 20 through the opening 34. For example, in one approach, the opening 34 may include an overall vertical length of about 268.7 mm (about 10.58 inches). Moreover, the downstream fan 24 may suction air through the opening 34, instead of receiving the airflow 36 generated by the upstream fan 22 through the diverter duct 20.

Referring generally to FIGS. 1, 3A, and 5, the ventilation system 10 may also include a third operating condition. During the third operating condition, the upstream fan 22 is not operating while the downstream fan 24 is operating. During the third operating condition, air may be suctioned from the opening 34 and through the diverter duct 20 towards the downstream fan 24. The upper surface 144 and the lower surface 144 of the contoured section 58 of the diverter duct 20 may facilitate and guide the air suctioned from the opening 34 towards the downstream fan 24. It is to be understood that during the third operating condition, sufficient air may be suctioned out of the opening 34. As a result, air may not be drawn from the inlet 30, and the upstream fan 22 may not substantially windmill.

Referring generally to the figures, the disclosed diverter duct 20 may provide an effective yet relatively economical approach for fluidly coupling and decoupling the upstream fan 22 from the downstream fan 24 based on the specific operating conditions of the ventilation system 10. The geometry of the first portion 50 of the diverter duct 20 and the air deflector 62 both direct substantially all the airflow 36 from the upstream fan 22 towards the opening 34 in the first operating condition, thereby fluidly decoupling the upstream fan 22 from the downstream fan 24. Directing substantially all of the airflow 36 towards the opening 34 during the first operating condition may generally prevent the downstream fan from inadvertently windmilling. Additionally, the diverter duct 20 includes geometry that may also fluidly couple the upstream fan 22 to the downstream fan 24 during the second operating condition. During the second operating condition, substantially all of airflow 36 generated by the upstream fan 22 may not flow out of the opening 34.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A diverter duct for a ventilation system, wherein the ventilation system is operable in a first operating condition, the diverter duct comprising:
    a main body defining an inner surface, a first portion including an inlet, a second portion located downstream of the first portion, a third portion including an outlet, and an opening located between the first portion and the third portion;
    a first contoured section formed in the first portion, the inner surface at the first contoured section having a center of a cross sectional area of a first, constant radius measured from a selected point offset from an outermost surface of the diverter duct curving to the opening such that an upper surface and a lower surface of the first contoured section form a section of a toroid;
    the second portion having a contoured section with a second radius measured between the center of the first portion and a selected point offset from an outermost surface of the diverter duct aligned with an axis of symmetry of the diverter duct extending through and opposite the opening, forming a section of a toroid, and configured to direct air received from the inlet towards the opening at the first operating condition; and
    an air deflector fixedly attached to and projecting around a portion of a cross section of a perimeter of the inner surface of the main body at a location downstream of the first portion, and having an edge extending from the inner surface coinciding with a continuation line of the upper surface of the first contoured section, the air deflector positioned at an angle with respect to the axis of symmetry of the diverter duct to deflect a portion of the air received from the inlet of the main body towards the opening at the first operating condition such that the air received through the inlet is substantially unable to exit the diverter duct through the outlet at the first operating condition.

2. The diverter duct of claim 1, wherein the first contoured section is circular in cross section.

3. The diverter duct of claim 1, wherein the second portion of the main body is configured to direct the air received from the inlet towards the third portion at a second operating condition.

4. The diverter duct of claim 3, wherein the second operating condition represents the air received from the inlet exiting the diverter duct through the outlet.

5. The diverter duct of claim 4, wherein the third portion of the main body is configured to direct the air received from the inlet of the main body out of the outlet of the main body at the second operating condition.

6. The diverter duct of claim 1, wherein the third portion of the main body is substantially a mirror image of the first portion of the main body.

7. The diverter duct of claim 1, wherein the second portion and the third portion of the main body each include respective contoured sections, and wherein the second portion is contoured in a direction that generally opposes a contour of the first portion and a contour of the third portion.

8. The diverter duct of claim 1, wherein the opening is sized such that at the first operating condition the air received through the inlet substantially fills the opening.

9. A ventilation system operable in a first operating condition, the ventilation system comprising:
    an upstream fan powered on and a downstream fan powered off at the first operating condition; and
    a diverter duct having an inlet fluidly coupled to the upstream fan, an outlet fluidly coupled to the downstream fan, the diverter duct further including:
    a main body that defines an inner surface, a first portion including the inlet, a second portion located downstream of the first portion, a third portion including the outlet, and an opening located between the first portion and the third portion;
    a first contoured section formed in the first portion, the inner surface at the first contoured section having a center of a cross sectional area of a first, constant radius measured from a selected point offset from an outermost surface of the diverter duct curving to the opening, such that an upper surface and a lower surface of the first contoured section form a section of a toroid configured to direct air received from the inlet of the main body towards the opening at the first operating condition; and
    an air deflector fixedly attached to and projecting around a portion of a perimeter of a cross section of the inner surface of the main body downstream of the first portion, and having an edge extending from the inner surface coinciding with a continuation line of the upper surface of the first contoured section, the air deflector positioned at an angle with respect to the axis of symmetry of the diverter duct to deflect a portion of the air received from the inlet of the main body towards the opening at the first operating condition such that the air received through the inlet is substantially unable to exit the diverter duct through the outlet at the first operating condition.

10. The ventilation system of claim 9, wherein the first contoured section is circular in cross.

11. The ventilation system of claim 9, wherein the second portion of the main body is configured to direct the air received from the inlet of the main body towards the third portion at a second operating condition.

12. The ventilation system of claim 11, wherein the second operating condition represents the air received from the inlet exiting the diverter duct through the outlet and towards the downstream fan.

13. The ventilation system of claim 12, wherein the third portion of the main body is configured to direct the air received from the inlet out of the outlet at the second operating condition.

14. The ventilation system of claim 9, wherein the third portion of the main body is substantially a mirror image of the first portion of the main body.

15. The ventilation system of claim 9, wherein the second portion and the third portion of the main body each include respective contoured sections, and wherein the second portion is contoured in a direction that generally opposes a contour of the first portion and a contour of the third portion.

16. The ventilation system of claim 9, wherein the opening is sized such that at the first operating condition the air received through the inlet substantially fills the opening.

17. A method of guiding air through a diverter duct of a ventilation system in an aircraft, the diverter duct including a first contoured section having an inlet, a second contoured section, and a third contoured section having an outlet, the method comprising:
    generating an airflow by an upstream fan, wherein the inlet of the diverter duct is fluidly coupled with the upstream fan such that the airflow generated by the upstream tan enters the inlet;

guiding the airflow generated by the upstream fan through an opening of the diverter duct by the first contoured section of the diverter duct at a first operating condition of the ventilation system, the first contoured section having a center of a cross sectional area of a first, constant radius measured from a selected point offset from an outermost surface of the diverter duct curving to the opening, such that an upper surface and a lower surface of the first contoured section form a section of a toroid;

deflecting a portion of the air received from the inlet towards the opening at the first operating condition by an air deflector fixedly attached to and projecting around a portion of a perimeter of a cross section of an inner surface of the diverter duct downstream of the first contoured section, wherein the air deflector is positioned at an angle with respect to the axis of symmetry of the diverter duct, and having an edge extending from the inner surface coinciding with a continuation line of the upper surface of the first contoured section, to deflect the portion of the air received from the inlet of the main body such that the air received through the inlet of the diverter duct is substantially prohibited from exiting the diverter duct through the outlet at the first operating condition such that a downstream fan fluidly coupled to the outlet of the diverter duct does not substantially windmill.

18. The method of claim 17, further comprising guiding the airflow generated by the upstream fan through an opening of the diverter duct by the first contoured section of the diverter duct at a second operating condition defined by the air received from the inlet exiting the diverter duct through the outlet and towards the downstream fan.

19. The method of claim 18, further comprising guiding the airflow generated by the upstream fan through an opening of the diverter duct by the first contoured section of the diverter duct at a third operating condition defined by the downstream fan operating and the upstream fan not operating.

20. A method of installing a diverter duct to an aircraft, the diverter duct including a first contoured section having an inlet, a second contoured section, a third contoured section having an outlet, and an air deflector, the method comprising:

fluidly coupling the inlet of the diverter duct with an upstream fan such that an airflow generated by the upstream fan enters the inlet of the diverter duct, wherein the airflow generated by the upstream fan is guided through an opening of the diverter duct by the first contoured section at a first operating condition, the first contoured section having a center of a cross sectional area of a first, constant radius measured from a selected point offset from an outermost surface of the diverter duct curving to the opening, such that an upper surface and a lower surface of the first contoured section form a section of a torrid; and fluidly coupling the outlet of the diverter duct with a downstream fan such that the airflow received through the inlet of the diverter duct is substantially prohibited from exiting the diverter duct through the outlet such that the downstream fan does not substantially windmill at the first operating condition, and wherein the air deflector of the diverter duct is fixedly attached to and projects around a portion of a perimeter of a cross section of inner surface of the diverter duct and downstream of the first contoured section to deflect the airflow towards the opening at the first operating condition.

* * * * *